United States Patent [19]

Elliott

[11] Patent Number: 4,520,842
[45] Date of Patent: Jun. 4, 1985

[54] HIGH PRESSURE VALVE FOR POSITIVE PRESSURE PUMPS INCLUDING MEANS FOR INSTALLING AND REMOVING THE VALVE

[76] Inventor: Robert E. Elliott, 2045 S. Holiday Hills Rd., Midland, Tex. 79703

[21] Appl. No.: 549,797

[22] Filed: Nov. 9, 1983

[51] Int. Cl.³ .............................................. F16K 15/02
[52] U.S. Cl. ............................... 137/327; 137/329.04; 137/543.15; 251/362; 417/454
[58] Field of Search .............. 137/327, 329.04, 543.15, 137/DIG. 3; 251/362; 417/453, 454

[56] References Cited

U.S. PATENT DOCUMENTS

| | | | |
|---|---|---|---|
| 1,619,950 | 3/1927 | Marty .................................... | 417/453 |
| 2,197,606 | 4/1940 | Birch ........................... | 137/543.15 X |
| 2,271,137 | 1/1942 | Hamer ................................. | 137/327 |
| 3,245,142 | 4/1966 | Williams .................... | 137/543.15 X |
| 3,474,808 | 10/1969 | Elliott ............................ | 137/327 X |

Primary Examiner—Robert G. Nilson
Attorney, Agent, or Firm—Head, Johnson & Stevenson

[57] ABSTRACT

A high pressure valve for a reciprocating pump including improved means of inserting and extracting the seat from the pump in which the pump has a seat deck of truncated conical configuration, the valve having a seat formed of a tubular element having a frusto-conical exterior configuration dimensioned to be received and retained by friction within the valve seat deck, the seat element having integral webs in the lower interior portion supporting a central stem supporting portion and the upper interior portion of the seat element being internally threaded. The seat element can be installed in or removed from a pump by threading into it an external puller head. Extending from the puller head is a puller stem which is externally threaded. To extract the seat from a pump a puller bridge is positioned across the access opening in the pump through which the seat is inserted, the bridge having an opening receiving the puller stem. A nut is threaded onto the puller stem to engage the bridge and apply force on the stem and thereby the head and seat element to extract it from the pump.

12 Claims, 5 Drawing Figures

HIGH PRESSURE VALVE FOR POSITIVE PRESSURE PUMPS INCLUDING MEANS FOR INSTALLING AND REMOVING THE VALVE

SUMMARY OF THE INVENTION

Most high pressure reciprocating pumps include a fluid end having an intake valve and a discharge valve. These valves must open and close against high fluid pressures. Since the valves are subjected to substantial wear as fluid is passed through them under high pressure conditions, the valves are preferably easily removeable and replaceable. Thus, in designing high pressure reciprocating pumps contrary conditions exist that is, the condition that the valves must stand opening and closing against high pressure fluid conditions, while nevertheless they must be expeditiously inserted or removed.

A known means of mounting a valve seat element of a valve structure is by the use of frictional engagement of the seat with a seat deck. Typically the seat deck has an internal frusto-conical surface which matches an external frusto-conical surface on the valve seat. When the valve seat is forced into frictional engagement with the seat deck it is retained within the seat deck; therefore, to replace the seat element it must be extracted from the seat deck.

The typical valve seat structure for high pressure pumps includes a central stem supporting portion which is held in place by integral webs. A common means of extracting the valve seat is to insert a tool having a J-shaped end configuration downwardly through the seat so that a portion of it extends underneath the webs. Upward force may then be applied on the tool to extract the seat. The problem is that in some high pressure pumps the force required to extract the seat may be several tons. This upward force tends to distort the webs, thereby distorting the seat and making it unavailable for reuse.

The present invention provides an improved valve seat for use in positive displacement high pressure pumps. In conjunction with the improved valve seat an improved method is provided for inserting the seat into the pump and, an improved method for extracting the seat from the pump.

The valve seat element is in the form of a tubular member having a frusto-conical exterior configured surface to be received in a pump tapered seat deck. The seat element has a central stem supporting portion having an internal threaded recess in the upper end a plurality of spaced apart webs extend between the stem retainer portion and the interior tubular surface to the seat element. Fluid can pass through the seat element by passing between the webs in the annular area between the stem retainer portion and the seat element.

The upper interior end of the seat element is threaded.

To complete the valve, a stem is threaded into the seat stem support. A valve disc having a central opening therethrough is positioned on the stem. A spring is positioned on top of the disc, the spring being received by the stem. A spring retainer is placed over the spring and, by means of an opening in the retainer, on the stem. A nut holds the retainer in position so that the disc is urged against seating engagement with the upper planar surface of the seat element.

To insert the valve into a seat deck in a high pressure pump a puller head is employed. The puller head has external threads on the lower portion which engaged the internal threads of the seat element. Extending axially upwardly from the puller head is a puller stem which is externally threaded. With the seat element threaded onto the puller head, the stem can be used to insert the seat element into a pump to engage the tapered seat deck within the pump. By means of a blow struck on the top end of the puller stem the seat element can be driven into frictional engagement with the seat deck, without distorting it. When the seat element is in position the valve can be assembled by the insertion of the valve stem, the disc, the spring, the retainer element and the nut.

To remove the valve the other elements are first removed from the seat element. The puller head is threaded into position on the seat element with the stem upwardly extending from it. A puller bridge having an opening to slideably receive the stem is inserted over the stem. The bridge engages the pump fluid end housing. A puller nut is then threaded over the puller stem to engage the upper surface of the puller bridge. By rotational force applied to the puller nut, tension is applied to the puller stem and the puller head to thereby extract the valve seat element.

DESCRIPTION OF THE DRAWINGS

FIG. 1 shows the valve in cross-section in the lower portion of the fluid end, the valve being the pump intake valve. The valve seat element of the upper or discharge valve is shown in the process of being pulled from the pump fluid end by means of a valve puller.

DESCRIPTION OF THE PREFERRED EMBODIMENT

Figure 1:
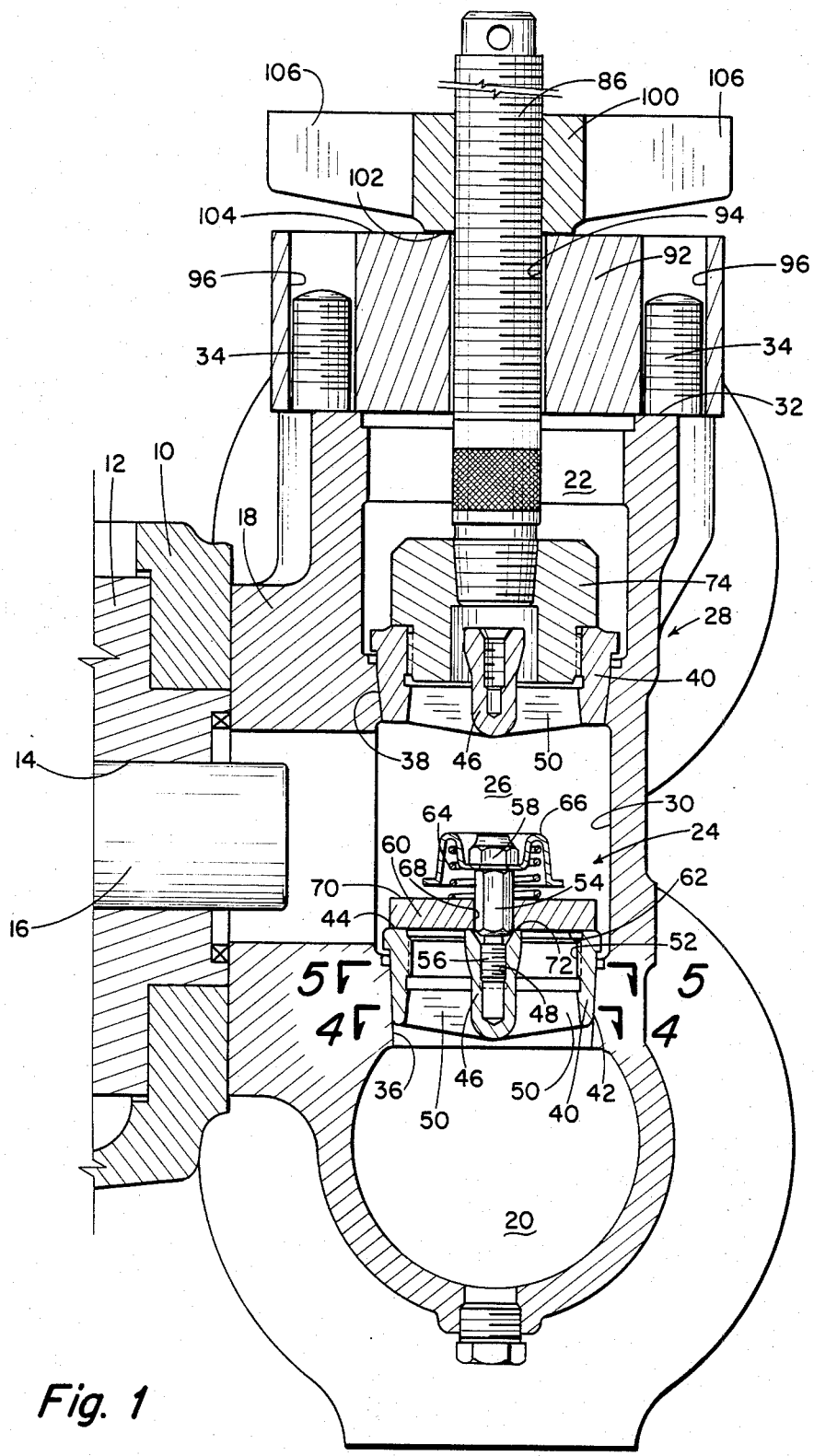
FIG. 1 is an elevational cross-sectional view of the fluid end of a positive displacement-pressure pump showing the valve structure of this invention. Specifically.

Referring first to FIG. 1 a portion of a positive displacement pump body is indicated by the numeral 10. Retained within the pump body is a sleeve 12 having a cylinder 14 formed therein. Reciprocated within cylinder 14 is a plunger 16. The mechanism by which plunger 16 is reciprocated is not shown but suffice it to say that the plunger 16 travels axially back and forth. On its intake stroke, that is movement to the left, fluid is drawn into the pump and on its exhaust stroke, that is movement to the right, fluid is forced from the pump.

The portion of the pump through which the fluid flows is called a pump fluid end 18. It is typically removeable from the pump body and a specific means of mounting it to the pump body are not shown in the drawings since such are well known in the art. The pump fluid end has a fluid inlet opening 20 through which fluid flows into the pump and a fluid outlet 22 though which fluid flows out of the pump. The piping connected to the pump fluid end is not shown since it is of a standard design well known in the industry.

The pump and fluid end described up to this point is of a standard design. The invention relates to the improved valve structures which permit the pump to take fluid in on the intake stroke of plunger 16, and to exhaust it on the discharge stroke. The invention also relates to the methods of inserting and removing the valves from the fluid end.

The fluid intake valve is generally indicated by the numeral 24. Fluid passes from the fluid inlet 20 through intake valve 24 into the pump middle section 26. The pump discharge valve is generally indicated by the numeral 28. The fluid end 18 includes a valve access passageway 30 having several areas of varying internal diameters and shapes, the valve access 30 terminating at the upper end in an opened top upper end 32. Positioned at the opened end 32 are threaded studs 34.

Formed in the valve access 30 is a lower tapered seat deck 36 which is of frusto-conical configuration. In like manner, an upper seat deck 38 is formed in the valve access 30. The upper seat deck 38 is of similar tapered, frusto-conical configuration to the lower seat deck, the primary difference being that the upper seat deck may be of somewhat larger diameter since, as will be described subsequently.

Received within the lower seat deck 38 is a seat element 40 of a unique design, the construction of which is important to the valve structure itself and to the method of inserting and removing the valve from the pump. Seat element 40 has a tapered exterior surface 42 which matches the taper of the seat deck 36. The upper end of the seat has a planar sealing surface 44 which is perpendicular to the frusto-conical axis of the exterior surface 42. Formed as an integral part within the interior of the seat element 40 is a stem support 46 having an axial recess 48 therein.

Figure 5:
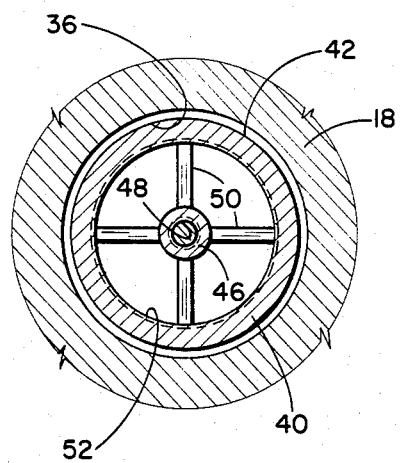
FIG. 5 is a cross-sectional view taken along the line 5—5 of FIG. 1 showing another cross-sectional view of the valve seat element.
Figure 4:
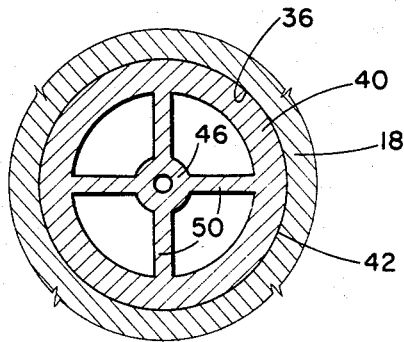
FIG. 4 is a cross-sectional view taken along the line 4—4 of FIG. 1 showing the lower portion of the valve of this invention as seated in a pump fluid end.

Supporting the stem support portion 46 within the seat 40 are a plurality (four being shown) of webs 50 (See FIGS. 4 and 5). These webs are spaced apart and extend radially from the stem support 46. The space between the webs 50 provide for fluid to flow through the valve seat element. The webs 50 are confined to the lower interior portion of the seat element 40. The upper interior portion is provided with internal threads 52.

Installed in the stem support 46 is a stem member 54. The upper end of opening 48 in the stem support has internal threads which receives the lower threaded portion 56 of stem 54. The upper end of stem 54 is also threaded and receives a nut 58.

Received on stem 54 is a valve disc 60 having a lower planar surface 62 which, when the valve is in closed condition as shown in FIG. 1, is in sealed engagement with the seat element sealing surfaces 44 and 72. A spring 64 is received about the upper end of stem 54. A spring retainer 66 receives the upper end of spring 64. The spring retainer 66 has, in cross-section a circumferential inverted U-shaped configuration to retain the upper end of spring 64.

Disc 60 has an opening 68 of a diameter slightly larger than the diameter of the stem 54 so that the disc is slideably receivable upon it. Disc 60 has an upper planar surface 70 matching the lower planar surface 62. Since the disc is symmetrical it can be seen that it can be reversed if the lower side 62 becomes worn and will function in the same manner with the upper side 70 in engagement with sealing surfaces 44 and 72.

The upper end 72 of the stem support 46 engages the disc 60 lower surface 62 only when such engagement is concomitant with the engagement of the sealing surface 44. Otherwise the disc will hold off of closure with the sealing surfaces permitting leakage of the valve.

In application of the invention it is preferable that the upper or discharge valve 28 be of similar construction to the lower or intake valve 24. The discharge valve seat 40 is often of slightly larger diameter to seal in a slightly larger seat deck 38. This is not essential to the invention, however.

The use of the same size valve assembly for both intake and exhaust is also a common pump construction which is not shown herein. When identically sized seats are employed, removal of the intake seat, after first having been pulled loose from its deck, is accomplished by removal of it through a cylinder head opening. But the invention is equally efficacious with this construction too.

Figure 3:
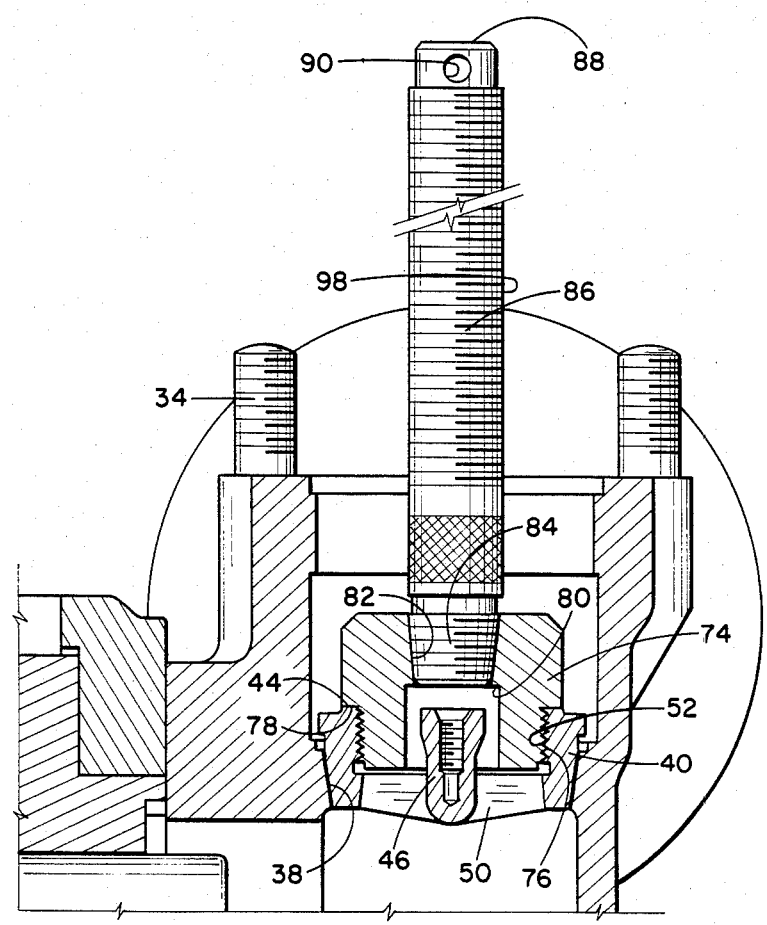
FIG. 3 is a cross-sectional view of the upper portion of a pump end showing the method employed for seating the valve seat in the discharge seat deck.

One of the most difficult problems connected with positive pressure pumps is that of installing and safely removing the intake and discharge valve. An important advantage of the valve of this invention, and an important aspect of the invention is the method by which the valve may be installed or safely removed from a pump fluid end. Turning first to FIG. 3, a method of installing a valve will be discussed. In FIG. 3 it is assumed that the valves have been removed from the pump fluid end 18 have been repaired or replaced as necessary and are in the process of being reinstalled. FIG. 3 assumes that the lower or intake valve (not shown) has already been installed and assembled and that the workman is in the process of installing the upper valve. For this purpose, a puller head 74 is employed. The puller head has an externally threaded lower portion 76 which threadably engages the valve seat internal threads 52. In addition, the puller head 74 includes an enlarged diameter upper portion providing a radial ledge 78 which, when the puller is threaded onto the seat element 40, engages the seat element upper sealing surface 44. The puller head 74 also includes a lower internal recess 80 so that when the puller is threaded onto a seat element 40 it clears the stem support 46, and also clears webs 50.

Formed in the upper end of the puller head is an axial internally threaded opening 82 which receives the lower externally threaded end 84 of a puller stem 86. The upper end 88 of the puller stem provides a surface 88 for receiving blows of a hammer.

To install seat element 40 it is first threaded onto the puller head 74. The seat is then positioned within the seat deck 38 and the upper surface 88 of the puller stem is struck with a heavy hammer. In a typical application of the invention the puller stem may be struck with a 50-pound blow. This drives the seat element into the tapered seat deck 38 so that the seat is securely retained within the pump fluid end.

After the seat element 40 is installed the puller head 74 is unthreaded from it by rotation of the puller stem 86. This may be accomplished by inserting a rod through opening 90 in the upper end of the puller stem. The tapered threaded end 84 may be keyed to the puller head 74 so that it will not unthread when the puller head is threaded onto or off of a seat element 40. (The use of a key is not germane to the invention)

Figure 2:
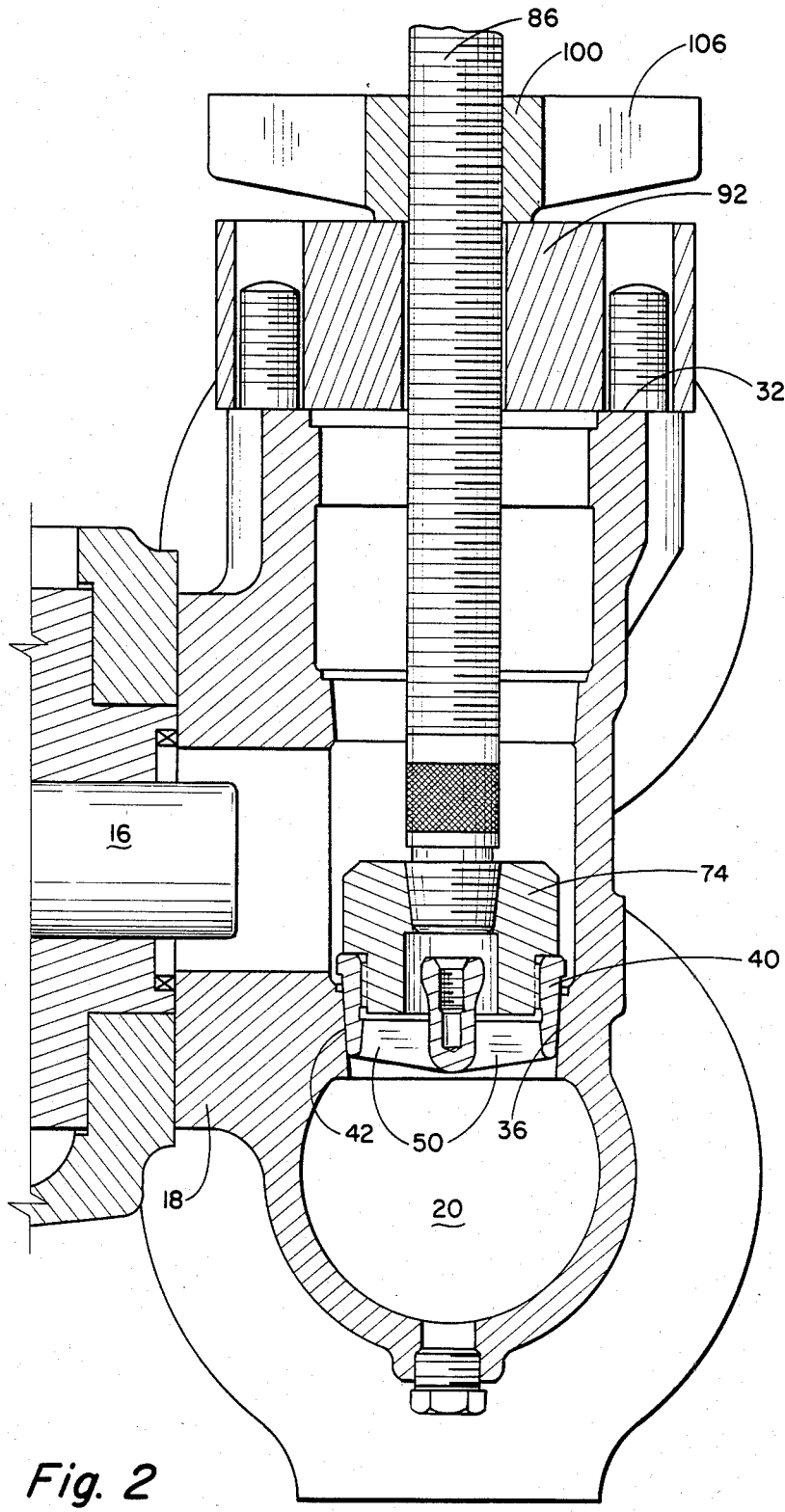
FIG. 2 is an elevational cross-sectional view of a pump fluid end as in FIG. 1 and showing the upper or discharge valve having been completely removed and all components of the lower or intake valve having been removed from the valve seat. A valve puller is secured to the valve seat as in the process of removing it from the pump.

Another difficult problem encountered in connection with valve seats in high pressure positive displacement pumps is that of pulling the valve seat from the pump when it is time to replace or repair a seat. The method of this invention of pulling the seats is shown in FIGS. 1 and 2. FIG. 1 shows the upper seat element 40 being pulled. It is assumed that the operator has removed the cover (not shown) which normally closes the upper end of valve access 30, the cover being held in place by bolts 34. Further, the workman has removed the nut, valve cover, spring, disc and valve stem from the upper or discharge valve 28. These can be readily done by ordinary tools inserted in the top of the valve access 30. Next the workman must pull the seat element 40 from retention within the seat deck 38. There is a tendency for the seat elements to stick tenaciously within the seat decks. This is particularly true if the valve has been in service for a long period of time or if the fluid being pumped is at high pressure and/or is extremely corrosive. For this reason a great force is usually required for extracting the seat element 40. Whereas in the past this has been a serious problem and with known types of valves and known techniques for pulling the valves, has usually resulted in the seat being destroyed against further usage. By the method of this invention the puller head is threaded into the seat element 40 in a manner as described when the seat is installed in the pump. The puller head 74 has the puller stem 86 extending upwardly from it. Next, a puller bridge 92 is employed. The bridge 92 has a central opening 94 which is non-threaded and is of a diameter to slideably received on the puller stem 86. Further, the puller bridge 92 preferably includes openings 96 which are also nonthreaded and which slideably receive the studs 34. The upper portion of the puller stem 86 is provided with external threads 98. Threaded onto the upper end of the puller stem is a puller nut 100. The lower surface 102 of the puller nut 100 engages the upper surface 104 of bridge 92. By the rotation of the puller nut 100 upward force is applied on a puller stem 86 and thereby to puller head 74 and seat 40 to extract the seat from seat deck 38. Since substantial force may be required, the puller nut 100 is preferably of a wing nut type having spaced apart extending wings 106 which are designed to receive the impact of hammer blows. In this manner the workman can pound on the wings 106 to apply great force as necessary to remove the valve seat 40.

After the upper or discharge valve 28 is removed, the workman can then remove the lower valve seat as shown in FIG. 2. After the upper seat element 40 is removed the elements of the intake valve can easily be removed and the puller head and puller rod inserted downwardly into the valve to extract the lower seat element as shown in FIG. 2. The only difference in the structure of FIGS. 1 and 2 is that since the lower valve seat element 40 may be of somewhat smaller diameter than the discharge valve seat element since it has to pass through the discharge valve seat deck 38, or it may be removed through a cylinder head opening if such be the design of the pump fluid end.

Thus, the invention provides not only a unique new seat element, a new valve structure for high pressure positive displacement pumps, but also improved method of installing the seats and removing them from a pump. The method enables the operator to remove safely the valves, including the valve seats without distorting or damaging them. In many instances, the valve seats can be restored for reuse by refacing the upper sealing surface 44. Since this is the only wear surface of the valve seat element this surface can be refinished and the seat element reused. By this arrangement of this invention wherein the seat elements are preserved from being distorted damaged or destroyed as they are removed from a pump the cost of repair and replacement of valves in high pressure positive discharge pumps is substantially reduced. Further, by the means of this invention the possibility of valves being improperly installed is also greatly diminished.

While the invention has been described with a certain degree of particularity it is manifest that many changes may be made in the details of construction and arrangement of the invention and in the steps and sequence thereof for practicing the method of the invention. While the invention is not to be limited to the specific embodiments set forth herein for purposes of exemplification it is understood that the invention is to be limited only by the scope of the attached claim or claims, including the full range of equivalency of each step or element thereof.

What is claimed is:

1. A high pressure valve seat for a reciprocating pump of the type which has a tapered frustro-conical shaped nonthreaded seat deck comprising:

a tubular seat element having an upper and lower end and having a frusto-conical exterior configuration dimensioned to be received in a pump tapered seat deck, the seat element having a centrally and coaxially positioned stem retainer portion (having an internally threaded recess in the upper end), the exterior dimension of the stem retainer portion being less than that of the tubular seat element interior diameter providing an annular flow passageway, including a plurality of spaced apart web members connected at their inner ends to said stem retainer portion and at their outer ends with the lower interior portion of the seat element, the areas between such web members providing fluid passageways in the seat element, the upper end of the seat element providing a circumferential sealing surface, and the upper portion of the seat element interior surface above said web members being internally threaded providing means of removing the seat element from a pump seat deck.

2. A high pressure valve seat according to claim 1 wherein said seat element, said stem retainer portion and said web members are integrally formed.

3. A high pressure valve seat according to claim 1 wherein said upper sealing surface is planar, the plane thereof being perpendicular the seat tubular axis.

4. A high pressure valve seat according to claim 1 having a threaded recess in said stem retainer portion which includes a non-threaded outwardly tapered portion at the recess upper end.

5. A high pressure valve for a reciprocating pump of the type which has a tapered frusto-conical shaped non-threaded seat deck, comprising:

a tubular seat element having an upper and lower end and having a frusto-conical exterior configuration dimensioned to be received in a pump tapered seat deck, the seat element having a centrally and coaxially positioned stem retainer portion having an internally threaded recess in the upper end, the exterior of the stem retainer portion being less than the tubular seat element interior diameter providing an annular flow passageway, including a plurality of spaced apart web members connected at their inner ends to said stem retainer portion and at their outer ends with the lower interior portion of seat element, the areas between such web members providing fluid passageways in the seat element, the upper end of the seat element providing a circumferential sealing surface, and the upper portion of the seat element interior surface above said web members being internally threaded providing means of removing the seat element from a pump seat deck;

an elongated valve stem having an externally threaded lower end portion threadably received in said seat element stem retainer threaded recess;

a valve disc having a central opening therein slideably receiving said valve stem, the disc having a lower sealing surface engageable with said seat element sealing surfaces;

a compression spring received by said valve stem and engaging the upper surface of said valve disc for normally retaining said disc sealing surface in engagement with said seat element sealing surfaces; and means at the upper end of said valve stem for engaging the upper end of said spring.

6. A high pressure valve for a reciprocating pump according to claim 5 wherein:
said seat element, said stem retainer portion and said web members are integrally formed.

7. A high pressure valve seat according to claim 5 wherein said upper sealing surface is planar, the plane thereof being perpendicular the seat tubular axis.

8. A high pressure valve for a reciprocating pump, according to claim 7 wherein said disc lower sealing surface is planar.

9. A high pressure valve according to claim 8 wherein both the upper and lower surfaces of said disc are planar sealing surfaces, the disc being thereby reversible for extending the useful life thereof.

10. A high pressure valve seat according to claim 5 wherein said recess in said stem retainer portion includes a non-threaded outwardly tapered portion at the recess upper end.

11. A high pressure valve according to claim 10 wherein said valve stem has an integral upwardly and outwardly tapered circumferential surface above said lower threaded portion, the tapered surface matching and serving to lock with said stem retainer portion tapered portion to resist inadvertant unthreading of said stem from said seat element.

12. A high pressure valve according to claim 5 wherein the upper end of said stem is externally threaded and wherein said means of engaging the upper end of said spring includes a spring retainer having a central opening therein receiving said stem upper threaded portion, the retainer having a circumferential spring engaging lower surface coaxial with said opening, the lower surface being of inverted U-shape in cross-section configuration.

* * * * *